INVENTOR.
MITSUO TOYAMA
HIROSHI MIDORIKAW,
HEINOSUKE YASUDA
TATSUO TAKESHIMA
NOBUO MAEJIMA

BY Buchnam and Anshu
THEIR ATTORNEYS

United States Patent Office 3,494,912
Patented Feb. 10, 1970

3,494,912
REFLEX-REFLECTIVE GLOBULAR FINE PARTICLES AND REFLECTIVE COATING MATERIALS CONTAINING THE SAME
Mitsuo Toyama, Hiroshi Midorikawa, Heinosuke Yasuda, Tatsuo Takeshima, and Nobuo Maejima, Tokyo, Japan, assignors to Rikagaku Kenkyusho and Nichiban Co., Ltd., both of Tokyo, Japan, and both corporations of Japan
Filed Dec. 8, 1965, Ser. No. 512,406
Claims priority, application Japan, Dec. 11, 1964, 39/69,406; Mar. 26, 1965, 40/17,208
Int. Cl. C07c 107/06; C09b 29/12; C08h 17/14
U.S. Cl. 260—206                                    5 Claims

ABSTRACT OF THE DISCLOSURE

Globules obtained by reacting an arylazo-resorcylaldehyde with an active methylene compound such as ethyl cyanoacetate, ethyl acetoacetate, or ethyl malonate in a ratio of 1:2 in the presence of piperidine are useful as reflectors in traffic signs and advertising signs because they cause reflexsive reflection of incident light.

---

Figure 1:
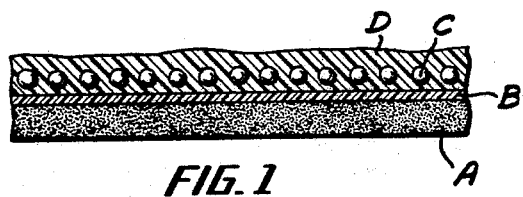

This invention relates to novel globular fine particles useful as a "reflexive light-reflector" and a light-reflective coating material containing the same. More particularly, this invention relates to a method for preparing reflectors which can dispense with formation of special coating thereon to prevent the reflectors from losing their reflectivity specially at night on account of the rain, etc. when they are used in traffic signs, advertising signs, etc. and can conveniently be used for many purposes including said traffic signs, etc. and to fine globular particles used in preparing the reflectors.

The term "reflection" used in this invention means "reflexive reflection" which, differing from "mirror reflection" that takes place toward a source of light only when the axis of an incident ray of light is parallel to a perpendicular to a reflective surface, is such that reflection occurs toward the source of light even when the incident ray of light strikes the reflective surface at an angle to the perpendicular to said surface.

Traffic signs, advertising signs, decorations and the like to which reflectors having such reflectivity are applied are extremely effective to attract public attention since they look as if they emit light when a ray of light from an automobile, etc. is thrown on them at night.

Conventionally glass beads have hitherto been used in making traffic signs, advertising signs, etc. as reflector means. These conventional reflector means as mentioned above, however, remarkably decrease in their reflectivity on account of getting wet in the rain since the glass beads used are partially embedded in the base material, leaving their upper portions exposed. Moreover, there have been disclosed, for example, a method for preventing such decrease in reflectivity as the above by using two kinds of glass bead reflectors the glass refractive indices of which are different from each other embedded partially in the base material, leaving their upper hemispherical portions exposed in the Japanese patent publication No. 3,783/1959 and a further method for several-time multiple coatings of special coating material in the Japanese patent publication No. 4,625/1952, which involve complicated steps in the manufacture of reflector means. And, when glass beads are used as a reflector means, a reflected light produced by the means is either colorless or of the same color as that of the metal used as a reflector adjuvant. Thus, it is necessary to color the glass beads themselves or to carry out an additional colored transparent coating over a special surface coating made on the beads as described in the Japanese Patent Publication No. 4,625/1952 if a colored reflected light is required.

On the other hand, the globules of the present invention are, per se, a coloring matter, and therefore a reflected light passing through the globules will look as if it were a colored one even if a colorless light strikes the reflective surface.

Another feature of the globules which are an organic coloring matter is that, when they are used in a minor amount together with a major amount of a transparent bonding medium in a major amount, as a coating material, for coating a metal surface therewith, the surface will be visible with metallic brilliance in the daytime as though the coating material were not covered with the coating material, and on the other hand they will look as if they were a colored illuminant at night when viewed from near the source of incident light, since the reflective surface struck by the incident beam of light returns the intense reflected ray of light even when such a small amount of the globules is used as described above.

When the fine globules of the present invention are used together with fluorescent pigments, the former will present the effect of reflection at night and the latter the effect of color in the daytime. This suggests that a sign, a poster or the like which looks different in color between during daytime and nighttime may easily be prepared.

The fine globules of this invention will not lose their reflectivity even when they are dispersed in a resinous medium, applied and then dried (at this point they are embedded in the resin) like the treatment of ordinary pigments since the refractive index ratio of the globules to a resin commonly used in preparing paints, etc. is high.

As is well known from the above description, the use the globules or the coating material containing them of the present invention provides the advantage that the decrease in reflectivity of various reflector means such as signs, due to their getting wet in the rain, is prevented without forming any special coatings on the reflective surface and without any special treatment to the reflector means.

An object of this invention is to provide a method for preparing "reflexively" reflecting fine globules and to provide the globules as a new reflective product which are, per se, a coloring matter such that the light reflected therefrom will be colored even when a colorless light strikes the reflective surface colored one even when a colorless light strikes the reflective surface.

Another object of this invention is to provide fine globules and to provide the globules as a new reflective compound which are a transparent organic coloring matter and which, in case a coating material consisting of a minor portion of the globules and a major portion of a bonding medium is coated on one surface of a metal sheet, will allow the color and luster of the underlying surface to be visible in the daytime in spite of the presence of the formed coating and will look at night as if they were a colored illuminant to observers on or near the axis of an incident ray of light when a colorless light impinges upon the reflective metal surface.

Still another object of the invention is to provide a method for preparing coating materials and to provide the materials as a new reflective coating composition which are composed of said fine globules, binders, pigments and the like.

A further object is to provide various reflective articles such as reflective films, reflective adhesive types and the like on which said coating material is coated.

Figure 2:
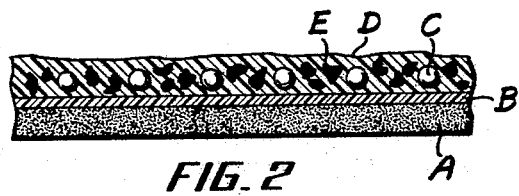
Figure 3:
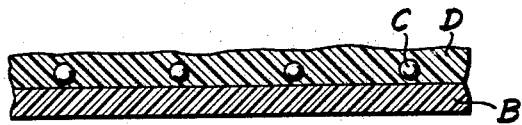

In the accompanying illustrative drawings:

FIGS. 1, 2 and 3 are diagrams indicating, in magnified form, sections of reflector means composed of a base, reflective coating and the like.

Now referring to FIG. 1, a reflector as an example is composed of a vacuum evaporated aluminum-deposited film of polyvinyl chloride, polyester or the like which is coated on one side with a resinous medium having the fine globules of this invention dispersed therein, and A is a film which is used as a base or backing. Films as bases can suitably vary in material and thickness depending on their uses. B is a layer formed by the deposition on A of vacuum evaporated aluminum, which has a metallic brightness and is useful to improve the reflectivity of the fine globules C; and the deposition, on a matted film, of the vacuum evaporated aluminum will improve "reflexive" reflectivity. D is a layer of bonding agent necessary to fix the fine globules in place, which may be any kind of high molecular compound adhesionable to both B and C as well as film-formable. The globules are normally suspended in a varnish or emulsion when used; and the varnish or emulsion to be used must, as a rule, be such that it does not dissolve the fine globules at all since the use of a suspending medium which dissolves, partly dissolves or swells them, will cause the fine globules of this invention to decompose and deform themselves, resulting in remarkably spoiling the functions intended by the present invention.

We have found as a result of our investigations that the aforesaid fine globules are soluble in many organic solvents including ketones, esters and aromatic hydrocarbons, and they are insoluble only in very limited kinds of solvents such as lower alcohols, certain paraffinic hydrocarbons, water and the like.

Accordingly, it is essential in the practice of this invention to pay particular attention to the selection of solvents in which bonding agents are allowed to be dissolved or suspended, and it has been found that such solvents are described in the following examples are necessary to attain the purpose of this invention. And further it is natural that the above high molecular substances selected should be thermosetting (heat reactive) ones which are hardly subject to the effect of the rain or the like.

The thus prepared reflector means looks as if it were coated with paint colored with the fine globules in the daytime and, on the other hand, it looks as if it emitted light when viewed by observers located on or near the axis of an incident ray of light striking the reflector means in the nighttime.

A further important feature of this invention is that a reflective layer as an adjuvant means of reflection, if any, as shown at B of FIG. 1 will increase the reflector means in its effect of reflection, resulting in producing not only reflection from an incident ray of light perpendicularly striking a reflective surface but also reflection even if the incident ray angularly strikes the reflective surface since the incident ray of light upon the layer of coating is refracted within the resinous layer in addition to the fact that the fine globules will not remarkably decrease in their reflectivity owing to being embedded in the resinous layer made of the high molecular substances as described above.

A still further advantage is that the possibility of obtaining fine globules which are $1\mu$ in diameter and perfectly spherical allows an incident beam of light to make its focal point, after passage through a globule, closely near the globule; and therefore not only reflective efficiency can be enhanced even if B in FIG. 1 and the globule are almost in contact with each other but also special film formation is not required to make a space between the globule and B.

FIG. 2 is a schematic sectional view, in magnified form, of a reflector means in which a mixture of other coloring matters such as pigments or the like with the fine globules of this invention each dispersed in a varnish for a paint or the like is coated on one face of the reflector means. In this case, in the daytime the color of the coloring matter such as pigments E or the like is visible to observers, while in the nighttime a reflected ray of light passing out through the fine globules is visible to observers located on or near the line of the incident ray of light. This particular phenomenon suggests that traffic signs and the like which look different in color between day and night may be prepared very easily.

FIG. 3 is an unique reflector means the metal surface of which is coated by spraying with a coating material made of the fine globules and varnish for a paint.

This reflector means will look as if it were not coated with the coating material under the ordinary daylight since a small amount of the fine globular organic coloring matter is dispersed in the coated varnish on the reflector means, while the color of the fine globules contained in the coated varnish will be brilliantly visible at night when viewed from on or near the axis of the incident beam of light upon the reflector means.

Now, as an example of practical use, such a coating material having red globular coloring matters dispersed therein is coated, for example, on a bumper of an automobile. In this case, the coated bumper of the automobile will look frightened with the metallic luster when observed under the ordinary daylight or other diffused illumination, whereas it will look as if it emitted a ray of red light at night during the illumination by the headlights of the automobile. When observed from on or near the axis of the incident light; such coating is, therefore, very effective to prevent one automobile from bumping into the rear of the other one as well as to protect the metal surface of the bumper against rusting, which is one of important uses of the fine globules.

As a practical example the reflective coating material prepared from a combination of a varnish for a paint, the fine globules of this invention and the like has hitherto been explained for easy understanding of the objects of this invention.

Examples of coating materials prepared from the fine globules of this invention as one component thereof are treating agents for plastic film, metal foil, paper, cloth, etc. in addition to light-reflective paints and printing ink, and moreover the fine globule will find a still wider range of uses in various fields.

A further example of the use of the coating material is preparation of reflective tapes. It is also easy to manufacture the reflective type composed of a film treated with the coating material of this invention and whose back surface is coated with pressure-sensitive adhesives.

As is known from the above description, the fine globule of this invention is very important from an industrial point of view in view of its wide uses and simplicity in manufacture.

The fine globule of the present invention is physically a colored, transparent sphere having a diameter of 0.8 to $3\mu$ which is capable of reflecting an incident ray of light with intense brilliance in a small-angle cone of light in the same path as that of the incident ray; the globule is chemically obtainable as an azo compound by coupling an aromatic hydroxy compound such as phenols or naphthols or derivatives thereof with a diazo compound, and more particularly the globule is obtained as a monoazo compound by coupling resorcylaldehyde as the aromatic hydroxy compound with diazotized aniline as one of diazotized compounds. The thus-prepared globule which is a monoazo compound is allowed to further react with cyanoacetic ester (or the equivalent) to improve the stability of the globule. In this case, an example of said derivatives of the aromatic hydroxy compound is coumarin, and said monoazo compound is a monoaryl azo compound of an aromatic hydroxylaldehyde.

The "reflexively" reflective fine globule is obtained as an azo compound by reacting a compound capable of coupling with diazotized aniline and/or derivatives thereof, that is, aromatic hydroxy aldehydes such as protocatechuic aldehyde, resorcyl aldehyde, gentistic aldehyde and 2,3-dihydroxybenzaldehyde in alkaline solution with diazotized aniline and/or derivatives thereof.

The globule is also obtained by further reacting said azo compounds with active methylene compounds such as cyanoacetic ester or acetoacetic ester in order to convert said azo compounds into more stable ones.

It is the resorcylaldehyde that is particularly suitable to the purpose of this invention of all aromatic hydroxy compounds capable of coupling with diazotized aniline and/or derivatives thereof. Generally speaking, a reaction product obtained by the reaction of a monoazo compound with an active methylene compound in the molar ratio of 1:2 has a remarkably reflective property.

The aforesaid azo compounds or the globular substance obtained can be varied from red to yellow in color largely depending upon what coupling components are combined.

This invention is best understood from the following example, Examples 1–4 illustrating methods for preparing the fine globule of this invention, respectively, and Examples 5–8 methods for manufacturing reflector means by using the product obtained in the Example 1, respectively.

EXAMPLE 1

To a 1-liter beaker are added 300 ml. of distilled water, 0.5 g. of resorcylaldehyde, 3 ml. of concentrated hydrochloric acid and then 0.4 ml. of aniline. To the resulting mixture 0.4 g. of sodium nitrite is added in portions with agitation below 8° C. and thereafter 4 g. of potassium carbonate in 10 ml. of distilled water added dropwise thereto. After the completion of the carbonate solution, the agitation is continued for further 20 minutes. The reaction mixture is allowed to stand at a cool, dark place for deposition. The deposited solid is filtered off, thoroughly washed with distilled water, extracted with hot alcohol to separate insoluble substance (consisting mainly of bis-azo compounds) by filtration. The filtrate obtained is, then, diluted with distilled water to deposit a rude monoazo compound. Recrystallization of the product from toluene gives 0.5 g. of 5-phenyl azoresorcylaldehyde in red needles with a melting point of 149–150° C.

*Analysis.*—Calcd. for $C_{13}H_{10}O_3N_2$: C, 64.46%; H, 4.16%; N, 11.57%. Found: C, 64.80%; H, 4.09%; N, 11.60%.

The crude monoazo compound obtained (0.01 mol) is dissolved in 40 ml. of hot alcohol containing ethyl cyanoacetate, ethyl acetoacetate or ethyl malonate in an amount of 0.02 mol, the resulting solution is incorporated with two drops of piperidine and then allowed to stand overnight to obtain an end compound of this invention.

EXAMPLE 2

Four grams of resorcylaldehyde is dissolved in a solution of 26 g. of potassium carbonate and 5 g. of crystalline sodium acetate in 100 ml. of distilled water. To the resulting solution is added a solution of diazotized p-toluidine (consisting of 3 g. toluidine, 4 ml. conc. hydrochloric acid and 2 g. sodium nitrite). During said addition, the reaction temperature is kept below 10° C. and thorough agitation carried out. The solid deposited is enough washed with distilled water, refluxed with 50 ml. of acetone for 10 minutes and thereafter the acetone-added mixture filtered to separate insoluble substance while the mixture is hot.

Thus, the filtrate is diluted with distilled water to deposit rude 5-p-tolylazo-resorcylaldehyde having a melting point of 149–151° C. Recrystallization from diluted alcohol yields 0.8 g. of desired azoresorcylaldhyde which is microcrystalline, yellow in color and melting at 152–153° C.

*Analysis.*—Calcd. for $C_{14}H_{12}O_3N_2$: C, 65.62%; H, 4.72%; N, 10.93%. Found: C, 65.60%; H, 4.84%; N, 11.36%.

This monoazo compound obtained (0.01 mol) is dissolved in 30 ml of alcohol, to the resulting solution are added 0.02 mol of ethyl cyanoacetate, ethyl acetoacetate or ethyl malonate and two drops of piperidine, and then the mixture is allowed to stand overnight to give an end product of this invention.

EXAMPLE 3

Three grams of m-toluidine is dissolved in 4 ml. of hydrochloric acid diluted with 20 ml. of distilled water and the resulting solution diazotized with 2 g. of sodium nitrite dissolved in 6 ml. of distilled water. The reaction temperature at this diazotization is desirably below 5° C. The diazotized toluidine obtained is added under enough agitation to a mixture, in 100 ml. distilled water, of 4 g. resorcylaldehyde, 26 g. potassium carbonate and 5 g. crystalline sodium acetate. The compound deposited is collected by filtration, washed thoroughly with distilled water, hot-extracted with 100 ml. of alcohol and filtered to separate insoluble matters, and then the filtrate diluted with distilled water to deposit crude 5-m-tolylazo-resorcylaldehyde. Recrystallization of it from diluted alcohol gives 0.3 g. of fine crystals; M.P. 134–135° C., orange in color.

*Analysis.*—Calcd. for $C_{14}H_{12}O_3N_2$: C, 65.62%; H, 4.72%; N, 10.93%. Found: C, 65.01%; H, 4.98%; N, 10.73%.

The monoazo compound obtained (0.01 mol) and ethyl cyanoacetate, ethyl acetoacetate or ethyl malonate are dissolved in 30 ml. of alcohol, the resulting solution incorporated with two drops of piperidine and then allowed to stand overnight to obtain an end product of this invention.

EXAMPLE 4

A solution of 0.5 g. of resorcylaldehyde in 250 ml. of distilled water is incorporated with diazotized m-chloroaniline (prepared from 0.46 g. of m-chloroaniline, 4 ml. of concentrated hydrochloric acid, 0.3 g. of sodium nitrite and 20 ml. of distilled water), to the resulting mixture is added with agitation a mixed solution of 2 g. potassium carbonate and 5 g. crystalline sodium acetate both dissolved in 10 ml. distilled water; the deposit thus produced is washed thoroughly with distilled water, hot-extract with alcohol, filtered to remove insoluble substances and then the filtrate diluted with distilled water to obtain crude 5-m-chlorophenylazo-resorcylaldehyde.

The crude product is recrystallized from diluted alcohol to yield 0.1 g. of a desired monoazo compound in brown fine crystals with a melting point of 155–156° C.

*Analysis.*—Calcd. for $C_{13}H_9O_3N_2Cl$: C, 56.42%; H, 3.25%; N, 10.13%. Found: C, 56.36%; H, 3.34%; N. 9.95%.

The monoazo compound obtained (0.01 mol) is dissolved in 40 ml. alcohol, then incorporated with ethyl cyanoacetate, ethyl acetoacetate or ethyl malonate, followed by addition of two drops of piperidine, and subsequently the resulting mixture is allowed to stand overnight to get an end compound of this invention.

EXAMPLE 5

This example illustrates a method for producing reflective coating material and for forming a film the structure of which is the same as that shown in FIG. 1 by using the coating material of the following composition:

| | Parts by weight |
|---|---|
| Red transparent globules which are a coloring matter of this invention | 25 |
| Melaqua 600 (NV 50%) | 100 |

Remarks: Melaqua 600 is a commercial varnish for an aqueous paint of melamine-modified acrylic family.

Homo-mixers may be used to disperse the globular coloring matter in the varnish, while conventional roll-mixers are not used because they will destroy the spherical structure of the coloring globules. The dispersion can satisfactorily be carried out only by the homo-mixer since the globules are extremely small in diameter as compared with common pigments.

The thus-prepared suspension may be coated or printed on an aluminum surface with metallic luster, in letters, pictures or other indicia or designs as required, dried an then cured at a temperature of 150° C. for half an hour to form a weatherproof film, which will allow the letters, pictures, etc. to be visible in a brilliant red color at night to observers such as occupants of vehicles when the film is illuminated by lights such as the headlights of the vehicles and, on the other hand, will allow them to be visible in the original color of the globules contained in the film under a diffused light such as an ordinary daylight.

If such film should be formed in an excess of thickness, then it will be not only visilble in a dark-red color during the daytime but also decreasing in reflective efficiency at night. Accordingly, the film is desired to be 0.03 mm. in thickness.

This reflective aluminum plate coated with said suspension is remarkably useful for traffic signs, advertising signs and the like.

EXAMPLE 6

This example illustrates methods for preparing a reflective coating material and for manufacturing a film by using the coating material the composition of which is as follows:

| | Parts by weight |
|---|---|
| Red transparent globules which are an organic matter | 6 |
| Resino Color 4202 | 6 |
| Polyvinyl alcohol | 4.5 |
| PVM/MA | 1.5 |
| Methanol | 8 |
| Water | 50 |

Remarks: Resino Color 4202 is a commercial red fluorescent pigment, and PVM/MA is a commercial copolymer of polyvinyl methylether and maleic anhydride.

A solution (strictly speaking, a suspension) of the coating material is prepared by dissolving PVM/MA and polyvinyl alcohol (degree of polymerization: 550) in methanol-water, blending Resino Color 4202 into the resulting solution by use of a roll for a paint or a colloid mill, and then adding the globular coloring matter to this red fluorescent pigment solution to disperse the matter therein while agitating with a homo-mixer.

The thus-prepared solution of the coating material is coated with a bar coater around which piano wires are wound in a suitable amount on one face of Metalumy (which is a commercial polyester film on which aluminum has been vacuum deposited), dried and then cured by heating at 160° C. for 5 minutes. The coated film obtained may be wound in rolls because of its flexibility, used as an adhesive tape by coating commonly-used pressure-sensitive adhesives on the reverse side of the film and easily used as an adhesive sheet by applying a releasable paper on the back surface of the film. And further, the film may be coated with heat-sensitive adhesives on the back surface since the base and the reflective layer of the coated film are both heat-resistive up to about 150° C.

Such a coated film as described above will assume a fluorescent red color caused by fluorescent pigments in the daytime and, on the other hand, it will look as if it itself emitted a red light owing to the reflection by the globules coated thereon when an incident ray of light strikes the reflective surface of the film in the nighttime.

Examples of uses of such films will be shown hereunder.

The tape mentioned above may be applied to suitable parts of automobile bodies to prevent traffic accidents from occurring, and it may extensively be used as signs specially useful at night. The coating material as prepared in this example may further be used in the same manner as described in Example 5 and may be used in printing by conventional means of printing.

EXAMPLE 7

This example shows the preparation of a solution of reflective coating material of the same construction as in FIG. 3. The solution is prepared in the same way as in Example 5 by compounding the following materials with each other:

| | Parts by weight |
|---|---|
| Red transparent globules which are an organic coloring matter | 20 |
| Nicasol CL 302 | 100 |

Remarks: Nicasol CL 302 is a commercial acrylic emulsion for a paint which contains dry matters in an amount by weight of 46% of the emulsion.

The above solution of the coating material has originally a red color. A metal surface on which the solution has been coated by a sprayer or with a brush will be visible as if it were a red illuminant to observers on or near the axis of the incident ray of light striking the coated metal surface only at night, whereas it looks colorless in the daytime.

Accordingly, a rear-end collision between automobiles may effectively be prevented without losing any luster of bumpers of the automobiles by coating the solution on the bumpers about 0.02 mm. thick.

EXAMPLE 8

This example describes a method for manufacturing an adhesive tape of polyester film which is coated on one surface with a coating material of the same composition as in Example 6 to form a reflective film on the surface and which is coated on the other surface with pressure-sensitive adhesives.

The reflective coating material and the bonding agent are prepared by compounding the following materials with each other, respectively:

| Coating material: | Parts by weight |
|---|---|
| Red transparent globules which are an organic coloring matter | 5 |
| NKP-702 | 10 |
| Polyvinyl butyral | 15 |
| Ethanol | 70 |
| Bonding agent: | |
| Natural rubber (Pale Crape #1) | 10 |
| ST-5080 | 8 |
| Ionol | 0.01 |
| n-Hexane | 120 |

Remarks: ST-5080 is polyterpene resin with a softening point of about 80° C. manufactured by the Schenectady Co., U.S.A., Ionol is an antioxidant manufactured by the Shell Oil Co., and NKP-702 a fluorescent pigment.

In this example, a solution of the coating material is prepared in the same way as in Example 6, and the bonding agent prepared by dissolving natural rubber milled as far as its viscosity reaches Mooney Viscosity 60 ML, together with TS-5080 and Ionol, in n-hexane. These two preparations are coated and dried on the surfaces of a film, respectively, by means of a commonly-used method.

The adhesive tape prepared in this example will present a green fluorescent color under the ordinary daylight, while it will be visible as though it emitted a ray of red light when struck by an incident ray of light at night.

In the four preceding examples with respect to reflector means, the transparent organic coloring matter globules and the bonding agent are used in amounts by weight of at least 4:100 (as dry matters) ratio to obtain the reflective coatings.

It is impossible to confine such a ratio to a specific range of values simply depending on the properties of a bonding agent and the color of reflective coatings when, for example, other coloring matters are additionally used to improve the intensity of reflected light at night and coloring effect during the daytime, though the transparent coloring globules may advisably be used in about the same amount by weight as that of the bonding agent in such examples as Examples 6 and 8.

In addition to the methods described in the preceding examples, reflector means con also be prepared by other methods such as a method which comprises forming a coating of hot melt type over the surface of the desired article, allowing the globular coloring matter to adhere closely and uniformly to the coating in an electrostatic way and then fixing the coating in an oven, a second method which comprises coating the globular coloring matter and an aqueous varnish on surfaces to be coated by means of electrodeposition or the like.

What is claimed is:

1. A fine globule consisting of a mono azo compound selected from the group consitsing of 5-phenylazo-resorcylaldehyde, 5-p-tolylazo-resorcylaldehyde, 5-m-tolylazoresorcylaldehyde and 5-m-chlorophenylazo-resorcylaldehyde reacted with an active methylene compound selected from the group consisting of ethyl cyano-acetate, ethyl aceto-acetate and ethyl malonate, wherein the globule is prepared by reacting the mono azo compound with the active methylene compound in a molar ratio of 1:2 and in the presence of piperidine.

2. The globule of claim 1, consisting of 5-phenylazo-resorcylaldehyde reacted with an active methylene compound selected from the group consisting of ethyl cyanoacetate, ethyl acetoacetate and ethyl malonate, wherein the globule is prepared by reacting 5-phenylazo-resorcylaldehyde with the active methylene compound in a molar ratio of 1:2 and in the presence of piperidine.

3. The globule of claim 1, consisting of 5-p-tolylazo-resorcylaldehyde reacted with an active methylene compound selected from the group consisting of ethyl cyanoacetate, ethyl acetoacetate and ethyl malonate, wherein the globule is prepared by reacting 5-p-tolylazo-resorcylaldehyde with the active methylene compound in a molar ratio of 1:2 and in the presence of piperidine.

4. The globule of claim 1, consisting of 5-m-tolylazo-resorcylaldehyde reacted with an active methylene compound selected from the group consisting of ethyl cyanoacetate, ethyl acetoacetate and ethyl malonate, wherein the globule is prepared by reacting 5-m-tolylazo-resorcylaldehyde with the active methylene compound in a molar ratio of 1:2 and in the presence of piperidine.

5. The globule of claim 1, consisting of 5-m-chlorophenylazo-resorcylaldehyde reacted with an active methylene compound selected from the group consisting of ethyl cyanoacetate, ethyl acetoacetate and ethyl malonate, wherein the globule is prepared by reacting 5-m-chlorophenylazo-resorcylaldehyde with the active methylene compound in a molar ratio of 1:2 and in the presence of piperidine.

References Cited

UNITED STATES PATENTS

| | | | |
|---|---|---|---|
| 1,934,361 | 11/1933 | Levinson | 260—343.2 |
| 2,298,459 | 10/1942 | Boese | 260—343.2 |
| 2,938,897 | 5/1960 | Armento. | |
| 3,004,821 | 10/1961 | Gano | 260—208 XR |
| 3,049,533 | 8/1962 | Spitzer et al. | 260—208 XR |
| 3,056,642 | 10/1962 | Kesler et al. | 260—208 XR |
| 3,071,815 | 1/1963 | MacKinnon | 260—208 XR |
| 3,344,132 | 9/1967 | Bien et al. | 260—152 |

OTHER REFERENCES

Auwers et al., C. A., vol. 17, pp. 736 to 738 (1934).

Beilstein, "Handbook Der Organischen Chemie," vol. 16, p. 220 (1933).

Sen et al. (I), C. A., vol. 28, pp. 7536 to 7538 (1934).

Sen et al. (II), C. A., vol. 29, p. 6886 (1935).

Ziegler et al., C. A., vol. 44, p. 1929h (1950).

Borsche et al., Berichte Deut. Chem., vol. 24, pp. 2094 to 2104 (1901).

Sethna et al., Chemical Reviews, vol. 36, p. 4 (1945).

FLOYD D. HIGEL, Primary Examiner

U.S. Cl. X.R.

40—125; 88—78; 106—20, 288; 117—128.4, 138.8, 143, 154; 260—208, 324.3